US011599668B2

(12) United States Patent
Nation et al.

(10) Patent No.: US 11,599,668 B2
(45) Date of Patent: Mar. 7, 2023

(54) SECURING ACCESS TO CONFIDENTIAL DATA USING A BLOCKCHAIN LEDGER

(71) Applicant: Oracle International Corporation, Redwood Shores, CA (US)

(72) Inventors: Joel Vincent Nation, Bruce (AU); James Peter George Ryles, Dunlop (AU)

(73) Assignee: Oracle International Corporation, Redwood Shores, CA (US)

( * ) Notice: Subject to any disclaimer, the term of this patent is extended or adjusted under 35 U.S.C. 154(b) by 158 days.

(21) Appl. No.: 17/078,469

(22) Filed: Oct. 23, 2020

(65) Prior Publication Data
US 2021/0056081 A1 Feb. 25, 2021

Related U.S. Application Data

(63) Continuation of application No. 15/991,204, filed on May 29, 2018, now Pat. No. 10,929,352.

(51) Int. Cl.
*G06F 21/62* (2013.01)
*H04L 9/32* (2006.01)
(Continued)

(52) U.S. Cl.
CPC ...... *G06F 21/6245* (2013.01); *G06F 16/1805* (2019.01); *H04L 9/0643* (2013.01); *H04L 9/3247* (2013.01)

(58) Field of Classification Search
CPC ............ G06F 21/6245; G06F 16/1805; H04L 9/0643; H04L 9/3247; H04L 9/50; H04L 63/10
See application file for complete search history.

(56) References Cited

U.S. PATENT DOCUMENTS 9,635,000 B1 ‡ 4/2017 Muftic ................. H04L 9/3239
9,838,376 B1 ‡ 12/2017 Lander ............... H04L 63/0861
(Continued)

FOREIGN PATENT DOCUMENTS

CN 107103252 A 8/2017
CN 107911373 A 4/2018
(Continued)

OTHER PUBLICATIONS

Arthur Unkown, "Hyperledger Fabric Model", Retrieved from: https://hyperledger-fabric.readthedocs.io/en/release-1.1/fabric_model. html; 4 pages, 2017.‡
(Continued)

*Primary Examiner* — Sarah Su
(74) *Attorney, Agent, or Firm* — Potomac Law Group, PLLC

(57) ABSTRACT

Methods and systems are provided for securing access to confidential data using a blockchain ledger. An update to access permissions can be received from a first entity on behalf of a second entity, the update can change access permissions to a confidential data store. A smart contract that validates the update can be called. Upon consensus from a blockchain community, the update to the access permissions for the second entity can be executed. The blockchain community can be a plurality of different organizations that share access to the confidential data store, and the update can be appended to a blockchain ledger that stores access permissions for the blockchain community.

20 Claims, 6 Drawing Sheets

(51) Int. Cl.
*G06F 16/18* (2019.01)
*H04L 9/06* (2006.01)

(56) References Cited

U.S. PATENT DOCUMENTS

| | | | |
|---|---|---|---|
| 9,990,504 B1 ‡ | 6/2018 | Chapman | H04L 9/0643 |
| 10,142,333 B1 ‡ | 11/2018 | Griffin | H04L 63/0861 |
| 10,382,388 B2 ‡ | 8/2019 | Li | G06Q 20/0658 |
| 10,437,585 B2 * | 10/2019 | Mills | G06Q 10/06 |
| 10,929,352 B2 * | 2/2021 | Nation | H04L 63/10 |
| 2016/0283920 A1 ‡ | 9/2016 | Fisher | G06Q 20/02 |
| 2016/0292672 A1 ‡ | 10/2016 | Fay | G06Q 20/36 |
| 2016/0300234 A1 ‡ | 10/2016 | Moss-Pultz | H04L 9/3263 |
| 2017/0011460 A1 * | 1/2017 | Molinari | G06Q 40/06 |
| 2017/0091397 A1 | 3/2017 | Shah | |
| 2017/0111175 A1 ‡ | 4/2017 | Oberhauser | H04L 63/08 |
| 2017/0155515 A1 | 6/2017 | Androulaki et al. | |
| 2018/0018723 A1 ‡ | 1/2018 | Nagla | H04L 63/08 |
| 2018/0060496 A1 * | 3/2018 | Bulleit | H04L 9/0643 |
| 2018/0130158 A1 ‡ | 5/2018 | Atkinson | G06F 21/604 |
| 2019/0104196 A1 ‡ | 4/2019 | Li | G06Q 20/06 |
| 2019/0180519 A1 * | 6/2019 | Hausman | H04L 9/3239 |
| 2019/0258807 A1 ‡ | 8/2019 | DiMaggio | H04L 41/28 |
| 2019/0278666 A1 ‡ | 9/2019 | Lin | H04L 9/3239 |
| 2019/0305938 A1 ‡ | 10/2019 | Sandberg-Maitland | H04L 9/321 |
| 2019/0342084 A1 ‡ | 11/2019 | Mehedy | H04L 9/0643 |
| 2019/0372834 A1 ‡ | 12/2019 | Patil | H04L 41/085 |
| 2020/0151350 A1 * | 5/2020 | Irazabal | G06F 16/2308 |
| 2020/0183883 A1 ‡ | 6/2020 | Yang | G06F 16/137 |
| 2021/0383428 A1 * | 12/2021 | Johnson | H04L 9/3236 |
| 2021/0409192 A1 * | 12/2021 | Gollogly | H04L 63/0807 |
| 2022/0108026 A1 * | 4/2022 | Ortiz | G06F 21/602 |

FOREIGN PATENT DOCUMENTS

| | | | | |
|---|---|---|---|---|
| CN | 107911373 A | ‡ | 4/2018 | |
| CN | 107911373 B | | 9/2019 | |
| JP | 2018525729 A | | 9/2018 | |
| JP | 2018525729 A | ‡ | 9/2018 | |
| JP | 2018533103 A | ‡ | 11/2018 | |
| JP | 2018533103 A | | 11/2018 | |
| JP | 2018537022 A | ‡ | 12/2018 | |
| JP | 2018537022 A | | 12/2018 | |
| JP | 2019521450 A | ‡ | 7/2019 | |
| JP | 2019521450 A | | 7/2019 | |
| WO | WO-2016003431 A1 * | | 1/2016 | G06F 21/10 |
| WO | 2017011601 A1 | | 1/2017 | |
| WO | WO-2017011601 A1 | ‡ | 1/2017 | G09C 1/00 |
| WO | 2017024071 A1 | | 2/2017 | |
| WO | WO-2017024071 A1 | ‡ | 2/2017 | G16H 10/60 |
| WO | 2018015177 A1 | | 1/2018 | |
| WO | WO-2018015177 A1 | ‡ | 1/2018 | G06Q 40/12 |
| WO | WO-2019231578 A1 * | | 12/2019 | G06F 16/1805 |

OTHER PUBLICATIONS

Arthur Unknown, "Oracle Label Security", Retrieved from http://www.oracle.com/technetwork/database/options/label-security/overview/index.html [May 29, 2018] 3 pages.‡

Outchakoucht et al., "Dynamic Access Control Policy based on Blockchain and Machine Learning for the Internet of Things", International Journal of Advanced Computer Science and Applications, vol. 8, No. 7, Jan. 1, 2017.‡

International Search Report and Written Opinion issued in International Application No. PCT/US2019/028098 dated Jun. 12, 2019.‡

Unknown, "Hyperledger Fabric Model", Retrieved from: https://hyperledger-fabric.readthedocs.io/en/release-1.1/fabric_model.html; 4 pages, 2017.

Unknown, "Oracle Label Security", Retrieved from http://www.oracle.com/technetwork/database/options/label-security/overview/index.html [May 29, 2018] 3 pages.

\* cited by examiner
‡ imported from a related application

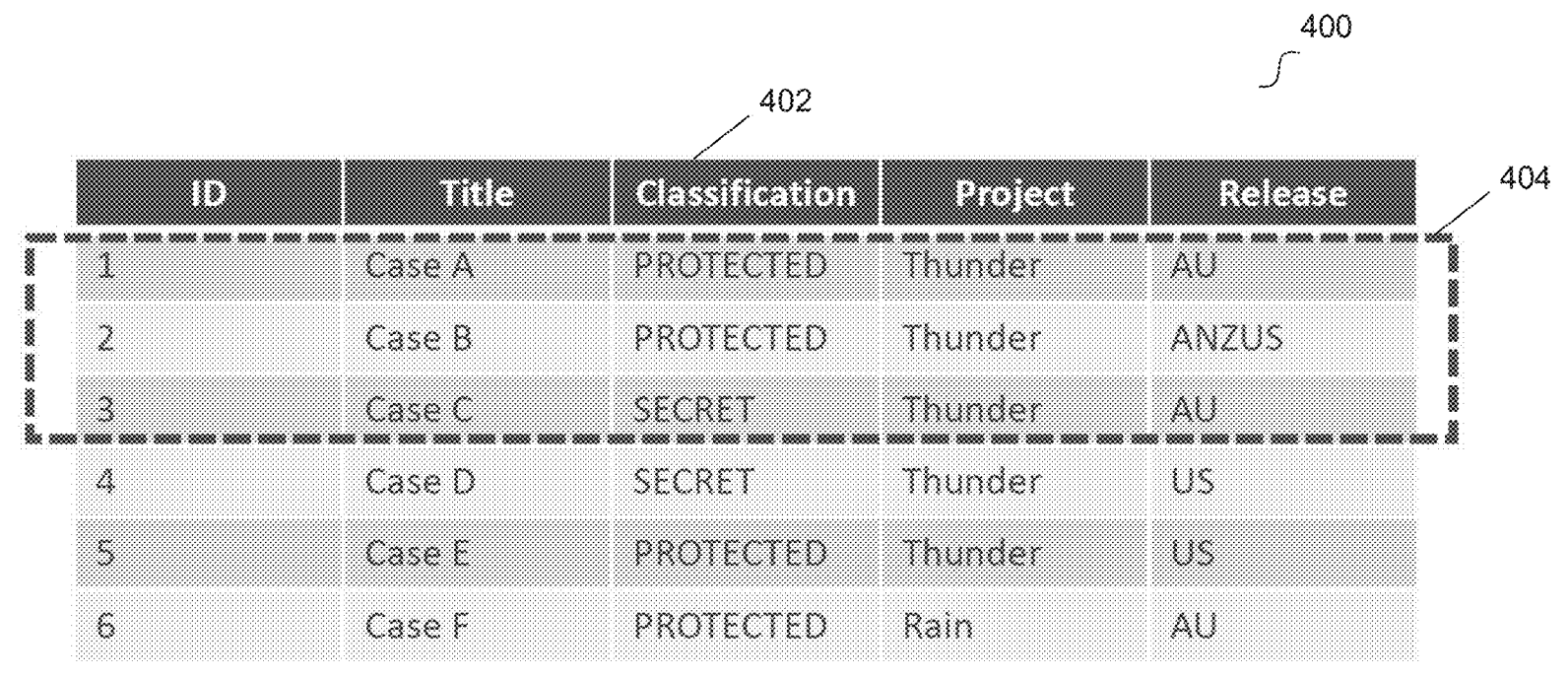

| ID | Title | Classification | Project | Release |
|----|-------|----------------|---------|---------|
| 1 | Case A | PROTECTED | Thunder | AU |
| 2 | Case B | PROTECTED | Thunder | ANZUS |
| 3 | Case C | SECRET | Thunder | AU |
| 4 | Case D | SECRET | Thunder | US |
| 5 | Case E | PROTECTED | Thunder | US |
| 6 | Case F | PROTECTED | Rain | AU |

Fig. 4

SECURING ACCESS TO CONFIDENTIAL DATA USING A BLOCKCHAIN LEDGER

CROSS REFERENCE TO RELATED APPLICATIONS

This application is a continuation of U.S. application Ser. No. 15/991,204, filed on May 29, 2018, the contents of which is hereby incorporated by reference.

FIELD

The embodiments of the present disclosure generally relate to securing access to confidential data using a blockchain ledger.

BACKGROUND

Organizations, such as corporate entities, governments, or other organizations, have sought to work with one another to leverage synergies, achieve business needs, or otherwise accomplish goals. However, the risks associated with sensitive information have kept organizations from sharing certain types of data. While data storage systems have improved in securing sensitive data, organizations are still concerned with the individuals that gain access to the sensitive data. Recent data breaches have demonstrated a need for transparency with regard to access permissions management when access to sensitive data is shared by multiple entities.

SUMMARY

The embodiments of the present disclosure are generally directed to systems and methods for securing access to confidential data using a blockchain ledger that substantially improve upon the related art.

An update to access permissions can be received from a first entity on behalf of a second entity, the update can change access permissions to a confidential data store. A smart contract that validates the update can be called. Upon consensus from a blockchain community, the update to the access permissions for the second entity can be executed. The blockchain community can be a plurality of different organizations that share access to the confidential data store, and the update can be appended to a blockchain ledger that stores access permissions for the blockchain community.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 4 illustrates a secure attribute data model according to an example embodiment.

DETAILED DESCRIPTION

Figure 1:
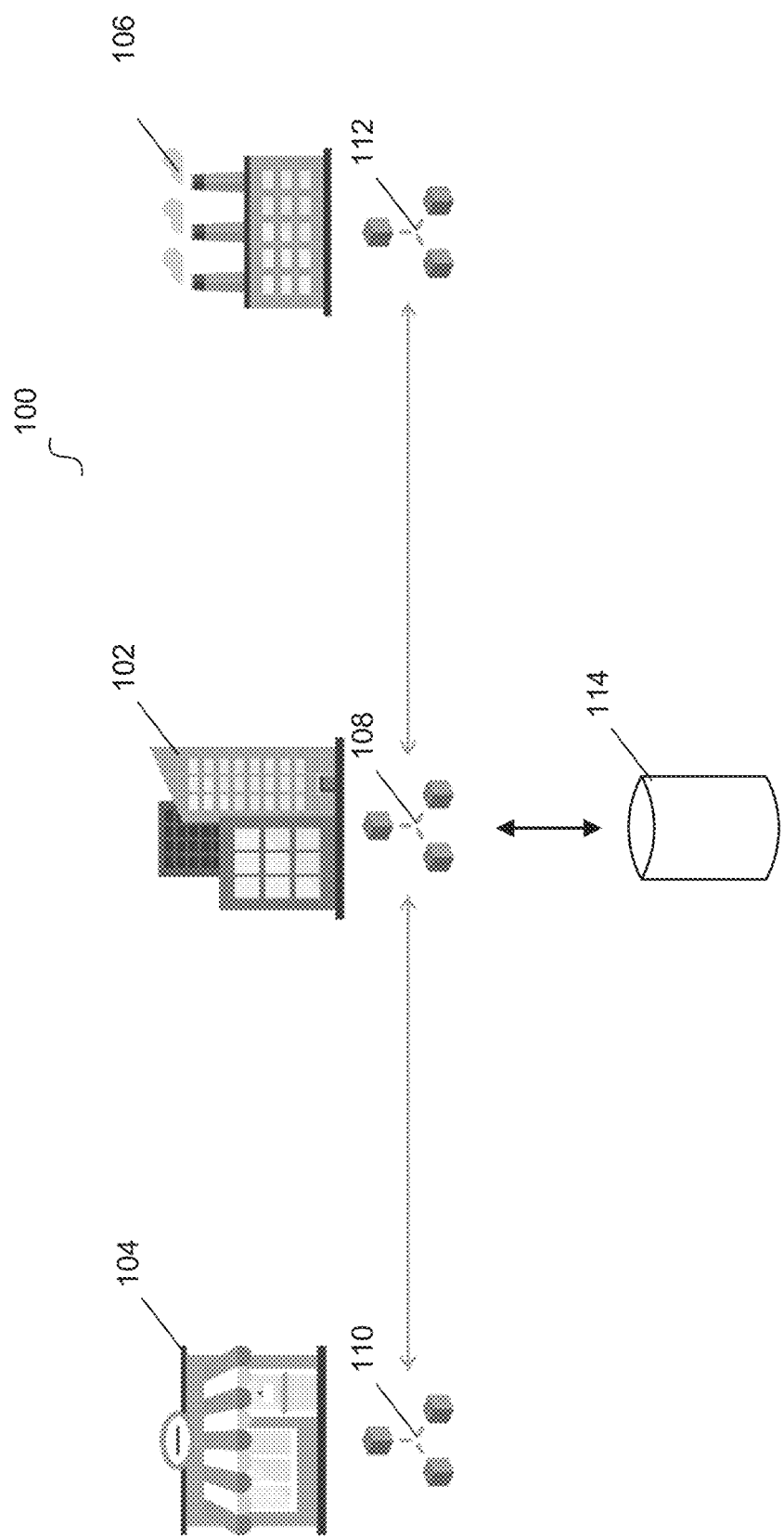
FIG. 1 illustrates a system for securing access to confidential data using a blockchain ledger according to an example embodiment.

Embodiments secure access to confidential data using a blockchain ledger. A blockchain ledger can be a distributed electronic ledger that includes connected records, or blocks, secured using cryptographic functions. Implementations of a blockchain can be recursive, where each block in a ledger includes a cryptographic hash of the block preceding it. Accordingly, a blockchain ledger can provide transparency for the underlying records or transactions represented by the ledger, for example from the genesis block (or transaction) to the most recent block (or transaction).

Embodiments manage access permissions for confidential information using a blockchain ledger. For example, some real-world circumstances call for multiple organizations to share access to confidential information. These circumstances can include the sharing of information identified as sensitive or confidential by a group or entity, such as a national government, in order to provide services to the group or entity, such as national security services. Other circumstances can similarly benefit from shared confidential information, such as joint ventures between organizations that rely on confidential or proprietary information, and the like.

In some embodiments, identities at each organization, such as individuals, can be granted access to various levels of the confidential information. For example, the confidential information can be stored in a database and keyed with varying security parameters (e.g., security classification level, title, project name, release, and the like). The access permissions for the identities of each organization can permit access to confidential information keyed with security parameters that correspond to the individual access permissions.

Embodiments secure access to the confidential information for these various identities across different organizations by managing access permissions and updates to access permissions using a blockchain ledger. For example, the different organizations that share access to the confidential information can represent members of a blockchain community. When an organization requests an update to the access permissions for one of its identities, a sequence of actions can be triggered (e.g., a smart contract can be called) to execute the transaction. The change can be proposed to the blockchain community by the requesting organization/identity. Once the blockchain community reaches a consensus, the smart contract can execute the change. A transaction or block can be appended to the blockchain that reflects the change in access permissions for the identity.

Accordingly, the blockchain ledger can store up-to-date and transparent access permissions for identities of the community members (e.g., participating organizations). In some embodiments, when an identity requests access to the confidential information, the database can query the blockchain to retrieve the up-to-date access permissions for the requesting identity. These access permissions can then be used to retrieve corresponding confidential information from the database, thus ensuring that up-to-date and transparent access permissions are used to retrieve only the confidential information that the identity is permitted to access.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for securing confidential data using a blockchain ledger according to an embodiment. System 100 includes entity 102, partners 104 and 106, blockchain 108, blockchain copies 110 and 112, and database 114. In some embodiments, entity 102 can be an organization that has access to confidential information stored in database 114. For example, database 114 can be a virtual private database, such as an Oracle® database that implements a Virtual Private Database ("VPD") protocol (e.g., Oracle® Label Security). Data stored in database 114 can be accessed by identities (e.g., authenticated individuals) of entity 102 based on managed access permissions for the identities.

In some embodiments, partners 104 and 106 can also be organizations that share access to the confidential information stored in database 114. For example, entity 102 can be an organization that participates in a joint venture with partners 104 and 106, where each organization has access to varying levels of confidential information stored in database 114. Entity 102 and partners 104 and 106 can each have associated identities (e.g., individuals) with access permissions configured to access certain data from database 114 secured with certain security parameters.

The access permissions for a set of identities associated with each of entity 102 and partners 104 and 106 can be managed using blockchain ledger 108 and blockchain ledger copies 110 and 112. For example, changes to the access permissions for the set of identities can be transparently and immutably represented by blockchain ledger 108. In some embodiments, blockchain ledger 108 can include an initial set of access permissions for the set of identities, and the appended blocks to blockchain ledger 108 represent changes to the initial set of access permissions. In such an implementation, blockchain ledger 108 can store up-to-date access permissions for the set of identities while also storing a transaction history for all changes to access permissions for these identities. In some embodiments, blockchain ledger 108 manages a central ledger while blockchain ledger copies 110 and 112 store copies of this central ledger.

In an example implementation, entity 102 can include identities A and B. Identity A can request a change in access permissions for identity B. This change can be submitted to the blockchain community (e.g., entity 102 and partners 104 and 106). Once the blockchain community achieves consensus, or approves the change, a block can be appended to blockchain ledger 108 that represents the access permissions change requested for identity B.

In an embodiment, when identity B requests access to confidential information, database 114 can retrieve the up-to-date access permissions stored for identity B by blockchain ledger 108. This secure and transparent management of access permissions ensures that identity B is only given access to secure information that the blockchain community has permitted.

In some embodiments, entity 102 can configure database 114 within an Oracle® Database and generate an agreed security model that secures the stored data. The model can include releasability markings, clearance, project names, and the like. Data stored within the system will then be controlled using Oracle® Label Security, VPD, and/or Data Release Accelerator (e.g., for National Security customers). Entity 102 could then configure blockchain 108 between each trusted party in a blockchain membership (e.g., partners 104 and 106) and valid users that can interact/access the blockchain could be agreed upon by the members. In some embodiments, smart contracts could be generated on the blockchain that allow individual users to add or change the security attributes of a user.

Embodiments realize a number of technical advantages over previously implemented systems. For example, embodiments that manage, store, and retrieve the access permissions for shared confidential information using a blockchain can provide enhanced transparency between member organizations that share the confidential information, thus encouraging data sharing adoption. Changes to the blockchain are immutable stored, and thus access permissions are available for efficient audit. The transparency and immutability of blockchain storage also allows data sharing partners to ensure that agreed upon security controls are effectively administered, further encouraging adoption of data sharing.

In addition, retrieving the access permissions directly from the blockchain prior to permitting access to a user/identity ensures that the most up-to-date (and transparently managed) access permissions are used. Some implementations leverage secure and lightweight access permissions/security attributes models (e.g., Oracle® Label Security), thus providing computationally efficient access permissions for the blockchain. For example, bulky access permissions could quickly result in a large blockchain that would generate more challenging computational problems when appending blocks.

In addition, the use of a distributed and secure encrypted ledger of records reduces the risk of breach that is prevalent in existing implementations that utilize a central database. For example, the transparent management of access permissions enables traceability so that the community can block access from untrusted actors/identities. Embodiments extend attributes based access control ("ABAC") to provide a more secure and technically improved implementation for managing access to confidential data.

Figure 2:
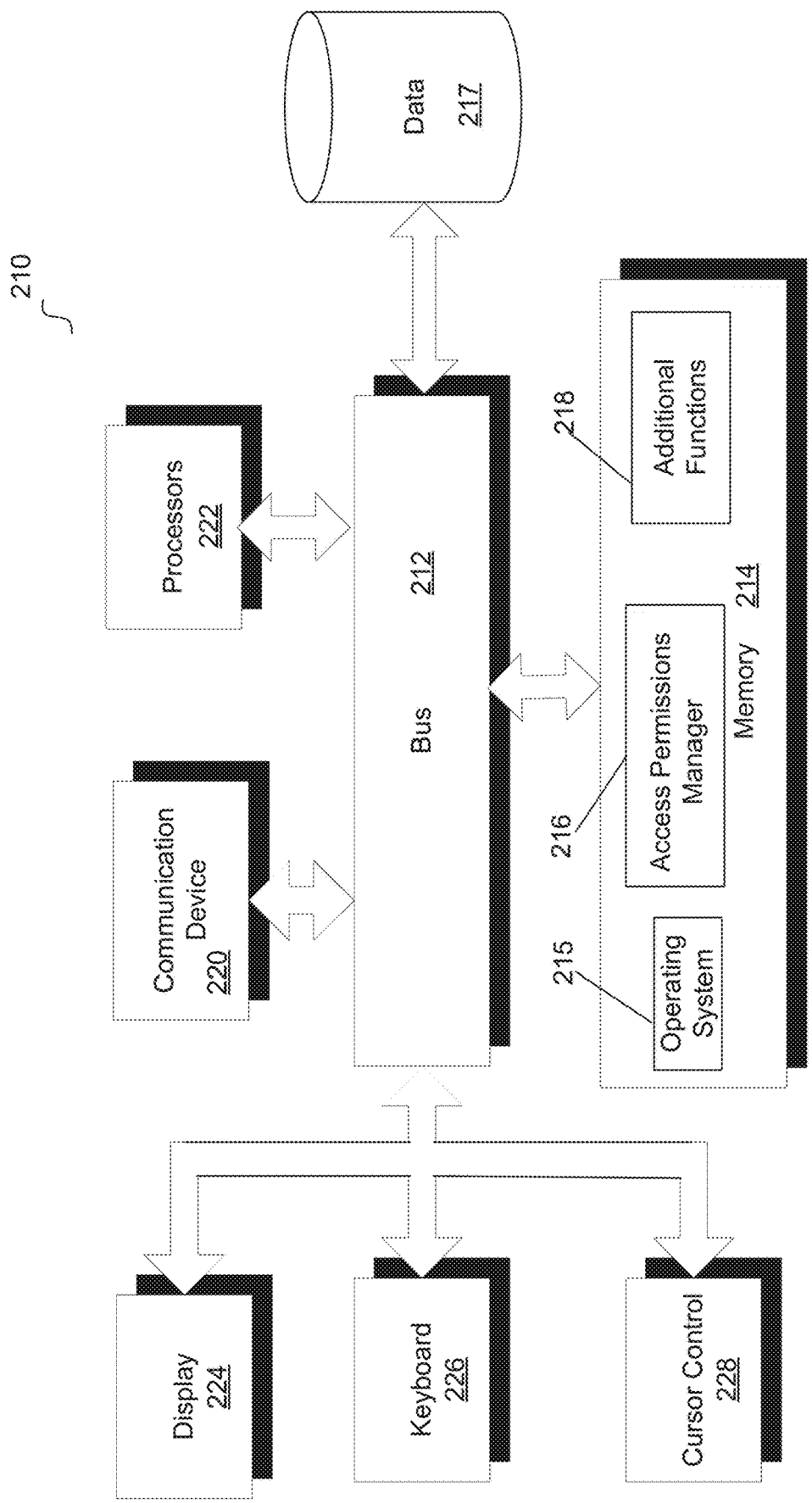
FIG. 2 illustrates a block diagram of a computing device operatively coupled to a blockchain ledger system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, access permissions manager 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, access permissions manager 216, as well as other applications modules 218. Operating system 215 provides operating system functionality for system 210. Access permissions manager 216 can provide functionality for storing and/or managing access permissions on a blockchain or may further provide any other functionality of this disclosure. In some instances, access permissions manager 216 can be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 118 may include the various modules of the engagement engine ("EE") embedded in Oracle® Cloud or modules of Oracle® Blockchain Cloud Service, for example. A database 217 is coupled to bus 212 to provide centralized storage for modules 216 and 218. Database 217 can store data in an integrated collection of logically-related records or files. Database 217 can be similar to database 114 of FIG. 1, an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), a NoSQL database, or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

In some embodiments, system 210 or a similar system can be implemented by blockchain community members to process blockchain ledger transactions. For example, system 210 can be used to perform the cryptographic functions related to appending a block to a blockchain ledger, or for performing other related blockchain cryptographic functionality (e.g., proof of work related computing, validation, consensus, and the like). For example, system 210 can implement the functionality of an Oracle® Blockchain Cloud Service, or any other cloud service and/or blockchain service.

Figure 3:
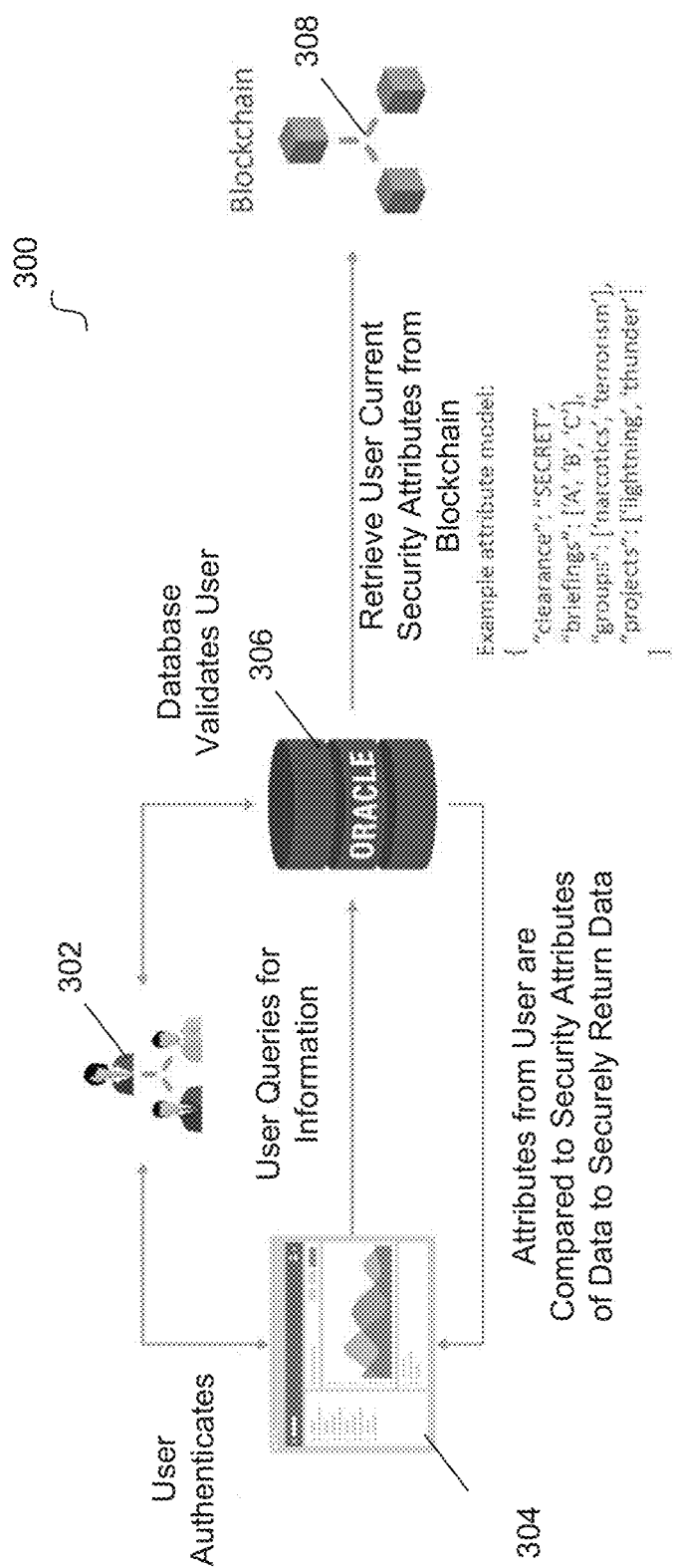
FIG. 3 illustrates a flow diagram for retrieving confidential data from a secure data store using a blockchain ledger according to an example embodiment.

FIG. 3 illustrates a flow for retrieving confidential data secured by a blockchain ledger according to an example embodiment. Flow 300 includes user 302, services 304, database 306, and blockchain 308. User 302 can be a user of an organization that is part of a blockchain community (e.g., entity 102 of FIG. 1). Services 304 can include software services suitable to implement various embodiments including an identity management service, database query service, web service, and the like. Example services can be provided by various blockchain and/or enterprise data solutions, such as services performed by various Hyperledger blockchain projects (e.g., Hyperledger Fabric) and/or Oracle® Blockchain Cloud Services. Database 306 can be similar to database 114 of FIG. 1 or database 217 of FIG. 2 and blockchain 308 can be similar to blockchain ledger 108 of FIG. 1.

In an embodiment, user 302 can perform identity authentication using services 304. For example, one of services 304 can include an identity management system for the organization associated with user 302 (e.g., entity 102 from FIG. 1). An example identity management system that can authenticate an identity of user 302 is Oracle® Identity Cloud Service ("IDCS"). In some embodiments, an organization can implement a cloud based user authentication system, such as the one described in U.S. Pat. No. 9,838,376. Any other suitable identity management system can also be implemented.

Once an identity for user 302 is authenticated, the user can leverage services 304 to query database 306 for confidential information. In response, database 306 can validate user 302, for example based on the user's previous authentication. In an embodiment, the identity management service can provide credentials that can be used for validation, such as a token. For example, an IDCS service can provide one or more tokens for user 302 such that various other systems, such as database 306, can validate the identity of the user.

Once user 302's identity is validated, database 306 can retrieve access permissions or security attributes for the validated identity from blockchain 308. In some embodiments, blockchain 308 can be considered a key-based ledger, and each identity would have a key (or address) on the ledger. In such an embodiment, database 306 can retrieve values for user 302's key on blockchain 308, as the data at this location of blockchain 308 corresponds to the security attributes for user 302's identity.

In some embodiments, blockchain 308 can include a database (e.g., separate from the confidential data store of database 306) which stores the current "state of the world" for the blockchain, where this state of the world is updated whenever transactions are added to the ledger. For example, this database can be a NoSQL database, and semi-complex querying can be performed to retrieve data.

In an implementation, the "state of the world" for blockchain 308 can include the up-to-date access permissions for identities for which blockchain 308 manages access permissions. In such an implementation, up-to-date access permissions can be retrieved from this database and used to access confidential data stored in database 306. In such an embodiment, although a database is used to store up-to-date access permissions for confidential data, blockchain 308 still maintains an immutable record and manages the execution of transactions for these access permissions. Thus, blockchain 308 still provides transparency and assurance that established policies for the management of access to confidential data are being implemented.

As illustrated in FIG. 3, an attribute model can be used to define the access permissions for an identity. In the illustrated example access permissions attribute model, the identity has "SECRET" clearance, is cleared for briefings "A", "B", and "C", belong to groups "narcotics" and "terrorism", and is associated with projects "lightning" and "thunder".

FIG. 4 illustrates an attribute model for secure data in accordance with embodiments. For example, and similar to the access permissions attribute model shown for identities in FIG. 3, secure data can similarly be keyed with security attributes 402 of model 400. Security attributes 402 can include a "Title", which can be similar to briefing, "Classification", "Project", and "Release". With regard to accessing confidential data stored in database 306, users/identities with access permissions that correspond to the secured attributes that secure a piece of confidential data can be permitted to access/retrieve the data.

For example, some implementations store secure data within relational data tables. The tables, rows, and/or columns of these relational data tables can have varying levels of security that limits access to the data. In an embodiment, a first table (e.g., set or rows and/or columns) may be secured using a first mix of security attributes while a second table is secured using a second mix of security attributes. Further, some embodiments include different mixes of security attributes at the column/row level of these data tables. Accordingly, an identity with corresponding security attributes may be permitted to retrieve data from the first table but not the second table, and in some implementations may be permitted to retrieve data from certain columns/rows of the first table but not other columns/rows of the first table.

In some embodiments, database 306 can be a VPD that implements Oracle® Label Security. For example, database 306 can be configured to store data using a security model agreed upon by the members of the blockchain community. For example, the security model can include release markings, clearance levels, project names, other security attributes illustrated in FIG. 4, and the like. Access to the stored data can be secured using other Oracle® VPD and Label Security features, and in some instances using Data Release Accelerator.

Considering the retrieved security attributes or access permissions illustrated in FIG. 3, the authenticated and validated identity of user 302 is permitted to retrieve information keyed with the security attributes of subset 404 based on a correspondence between the access permissions for the identity of user 302 and the security attributes of the subset 404. The access permissions for identities and/or security attributes for confidential data can be similarly structured, or can differ in some embodiments.

In addition, access permissions/security attributes can include hierarchical structures, such as a high level security clearance, higher level security clearance, and highest level security clearance. In this example, access permissions with the highest level security clearance are permitted to access/retrieve highest level, higher level, and high level secured data, access permissions with higher level security clearance are permitted to access/retrieve higher level and high level secured data, and access permissions with high level security clearance are permitted to access/retrieve only high level secured data. Other access permissions/attributes can similarly implement hierarchical functionality.

Returning to FIG. 3, requested confidential data keyed with security attributes that correspond to the returned access permissions for the identity of user 302 can be returned to user 302/services 304. For example, if user 302/services 304 requested retrieval of a set of secured data from database 306, the secured data returned by database 306 would be the requested data that corresponds with the access permissions for the authenticated identity of user 302 returned from blockchain 308.

Figure 5:
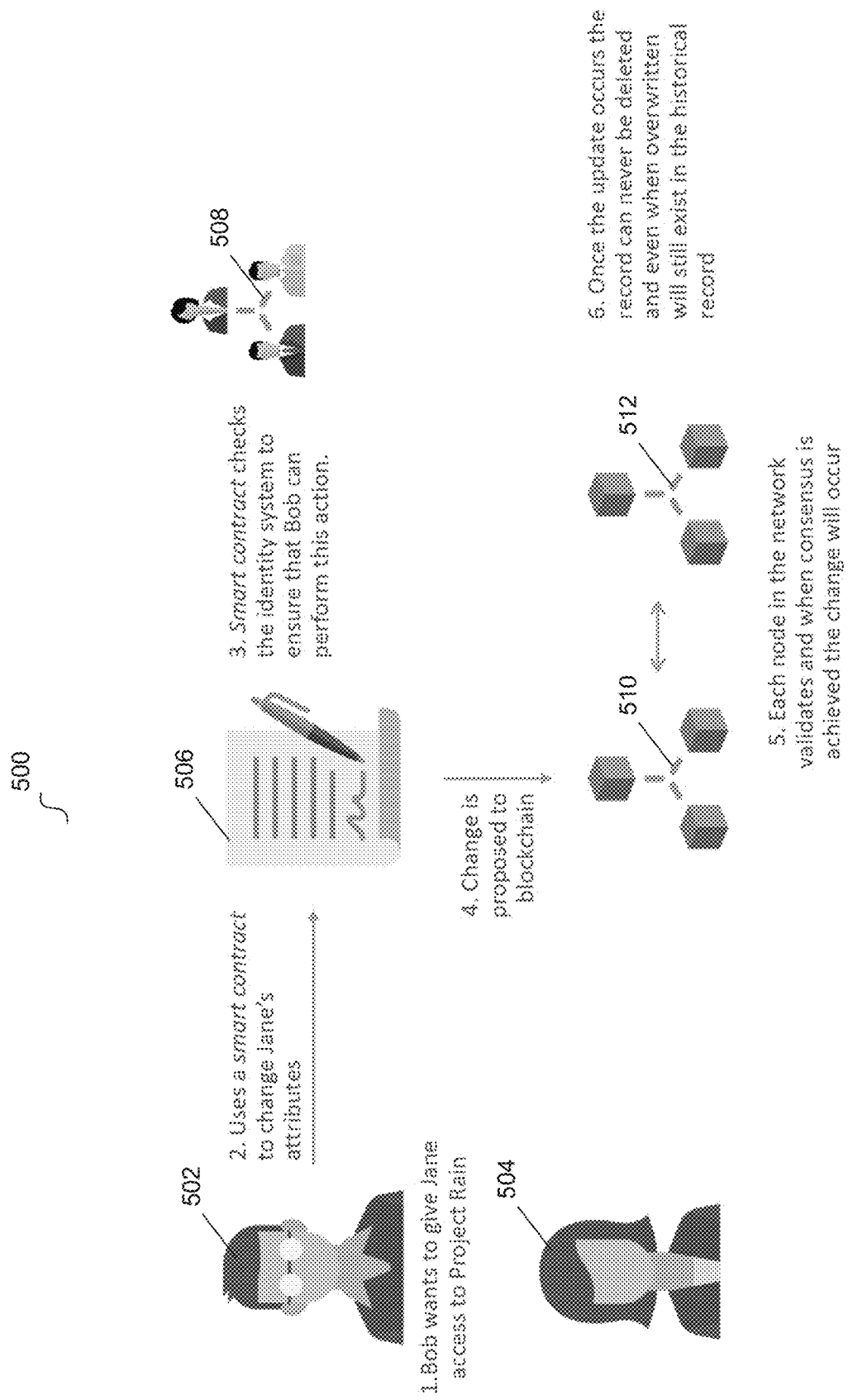
FIG. 5 illustrates a flow diagram for updated access permissions for access to confidential data using a blockchain ledger and a smart contract according to an example embodiment.

FIG. 5 illustrates a flow for updating access permissions for an identity according to an embodiment. Flow 500 includes users 502 and 504 (e.g., Bob and Jane, respectively), smart contract 506, identity service 508, blockchain 510, and updated blockchain 512.

In an embodiment, users 502 and 504 can be users associated with a first organization that is part of a blockchain community, as discussed in this disclosure. Access permissions for user 504 may, from time to time, be updated, for instance based on changes to the user's work assignment, or any other suitable circumstances. Accordingly, user 502 may request a change to user 504's access permissions. In this example, user 502 may be delegated certain privileges to change access permissions for users associated with the first organization, for example within the identity service 508. In other embodiments, user 504 can request to update these access permissions, and a flow similar to flow 500 can be followed.

An example identity service 508 is Oracle® IDCS, as further discussed in this disclosure. In this example, the identity service 508 can be affiliated with the first organization, but other structures can similarly be implemented, such as an identity service that manages identities for a variety of organizations (e.g., the first organization and other organizations within the blockchain community).

In an embodiment, in order for user 502 to request an update to user 504's access permissions, a smart contract service can be called to execute smart contract 506, which can be a series of actions that ultimately implement the update. A smart contract can be considered a semi-automated series of actions, executed by software, that follows a flow of execution based on the results of the actions. An example smart contract executed by software can include a consensus action. For example, a community may agree that a certain action should be taken, such as executing a piece of software code, once a majority of the community agrees to the action. A smart contract may electronically receive votes or other indications from the community as to whether the action should be taken, and once a majority of the community has agreed, the smart contract can automatically execute the action (e.g., piece of code).

Smart contract 506 can first authenticate identities for users 502 and 504 (e.g., Bob and Jane) with identity service 508. In an embodiment, smart contract 506 can then determine whether user 502, Bob, has authority to change access permissions for user 504, Jane. In some embodiments, the authority to change access permissions can be based on the requested change.

For example, user 502 can have a role within identity service 508 and the first organization. If the requested change is of a first type, such as a mandatory access control change (e.g., a change to a security clearance level), user 502 will be permitted to make the change when the user's role permits the first type of change (e.g., a security officer within the first organization). If the requested change is of a second type, such as a discretionary access control change (e.g., a change to a group or project), user 502 will be permitted to make the change when the user's role permits the second type of change (e.g., an administrator for the group/project within the first organization). In some embodiments, organizations/identity management systems can also incorporate additional business logic/rules that determine when a user is permitted to change access permissions for (other) users of the organization.

If users 502 and 504 have successfully authenticated and user 502 is permitted to execute the specific change requested to user 504's access permissions, smart contract 506 can propose the change to blockchain 510. As discussed above, blockchain 510 can include a plurality of blockchain community members (e.g., organizations). Members of the blockchain community can validate the proposed change, and when consensus for the blockchain is achieved, a block can be appended to blockchain 510 to generate updated blockchain 512. Accordingly, flow 500 has generated an immutable and transparent ledger of records that represents changes to access permissions (e.g., used to access shared secure data) for users affiliated with members of the blockchain community.

In some embodiments, consensus of blockchain 508 can be achieved using one or more of Practical Byzantine Fault Tolerance ("PBFT") algorithms, Proof of Authority ("PoA") and/or Proof of Elapsed Time ("PoET") algorithms. PBFT algorithms, such as those implemented by Hyperledger Fabric, can provide consensus amongst agreed nodes. One benefit of PBFT is it can mitigate against malicious nodes, which can be useful in a less trusted permissioned ledgers or to guard against the risk that organizations in a blockchain community become compromised by malicious code. PoA has designated nodes that will update a transaction once enough (e.g., a majority of) designated nodes agree. This can be useful in a permissioned ledger where some nodes have authority while others do not. PoET is based on spreading the chance to execute a transaction across nodes of the permissioned ledger. This can be useful when any node (or any from a subset of the nodes) can be trusted to change the permissioned ledger.

In some embodiments, when consensus is achieved and a new block is added to the blockchain, the block is stored with the hash of the previous block, a timestamp, a nonce (an arbitrary random number), and the hash of the data being added in this block. In some embodiments, the data itself is not encrypted and can technically be read by nodes of the blockchain ledger. Although the data itself is not encrypted in some embodiments, the identities are protected, as each identity is referenced by an address (e.g., within the blockchain). In other words, the fact that identity A has "Top Secret" clearance can be protected because the address for identity A lists the clearance level. In some embodiments, a set of access permissions may be encrypted, such as those with "Top Secret" clearance or some other sensitive access permission. In this example, the database could be provided decryption keys such that validating nodes could be provided the decrypted data to validate it.

Embodiments can leverage any suitable software services and implement various versions of the blockchain technology. For example, embodiments can include one or more configured Hyperledger projects, such as Fabric, to implement the functionality disclosed. In some embodiments, the data processing and cryptographic functions leveraged by the blockchain can include public key, private key, and digital signature cryptographic techniques, hash functions and cryptographic hash functions (e.g., secure hash algorithm ("SHA"), SHA-0, SHA-1, SHA-2, and the like), and any other suitable data processing or cryptographic functions used to secure the ledger while also maintaining feasible computational (e.g., "proof of work") scenarios.

Embodiments can also implement any suitable "smart contracts" or any suitable substitutes. For example, Hyperledger "chain code" can be configured to execute the disclosed smart contract functionality, or any other suitable automated functionally or code can be implemented.

In some embodiments, changes to a user's access permissions can remain private between a subset of the blockchain community. For example, the "channels" feature of Hyper Ledger Fabric can be used to implement private communication between a subset of members for a given channel. In other embodiments, there may be other blockchain implementations that have a similar concept. This functionality can provide private transactions between parties within the blockchain community. For example, organization A and organization B can apply changes to access permissions for a given identity, but this change can be hidden from other members of the blockchain community.

In such an embodiment, the database can have access to this private transaction, so either the database is given permission to view this private data or a private ledger can be generated for the subset, and the private ledger can be used when exposing access to their own systems (and those systems would connect to that private ledger). In these embodiments, with reference to auditing, the changes to the blockchain ledger are limited to the ledger(s) the parties/organizations can access.

Embodiments can also include one or more distributed applications or apps that can be used to interface with the blockchain (or copies of the blockchain). For example, users for member of the blockchain community (e.g., organizations sharing confidential data) can access the blockchain using one or more applications or apps (e.g., mobile app or lightweight application) running on a client computing device (e.g., server, laptop, mobile device, and the like). For example, an application may be configured to interact with the database storing confidential information for the blockchain community (using one or more software services) in order to request access to portions of the confidential information. In another example, an application may be configured to receive proposals from smart contracts such that the blockchain (or copies of the blockchain) can be accessed/manipulated. For example, the application can be used to achieve consensus and ultimately process the blockchain to append a new block.

In some embodiments, members of the blockchain community can interact with the blockchain using configured systems that manage existing security protocols or via a website (e.g., custom web or mobile portal). In the case of an existing identity system, a user's attributes can be updated through normal channels (e.g., by changing roles in the organization, being briefed onto a project, and the like) and then the identity system can call the blockchain and run the smart contract to apply these changes to the identity for the user (e.g., noting that the identity's blockchain address would be recorded in their identity attributes). In some embodiments, one party/organization may be involved, that is that an organization's employee is being given access to data holdings in the confidential database that are owned by that organization.

In some embodiments, a user can interact with a website (e.g., portal) and interface with a web form to provide details of the access permissions change. This can include the access permissions to add/change (e.g., project, releasability, group, tag, and the like) and the address of the user/identity for which the changes are being implemented. In some embodiments, the address of the requesting user is also included in this submission (e.g., in order for the smart contract to check this user's change permissions). Such an interaction can trigger a smart contract on the blockchain to validate the request, as further discussed above. In some embodiments, additional workflows can also be performed (e.g., to approve the request), for example within the smart contract or the web form.

Figure 6:
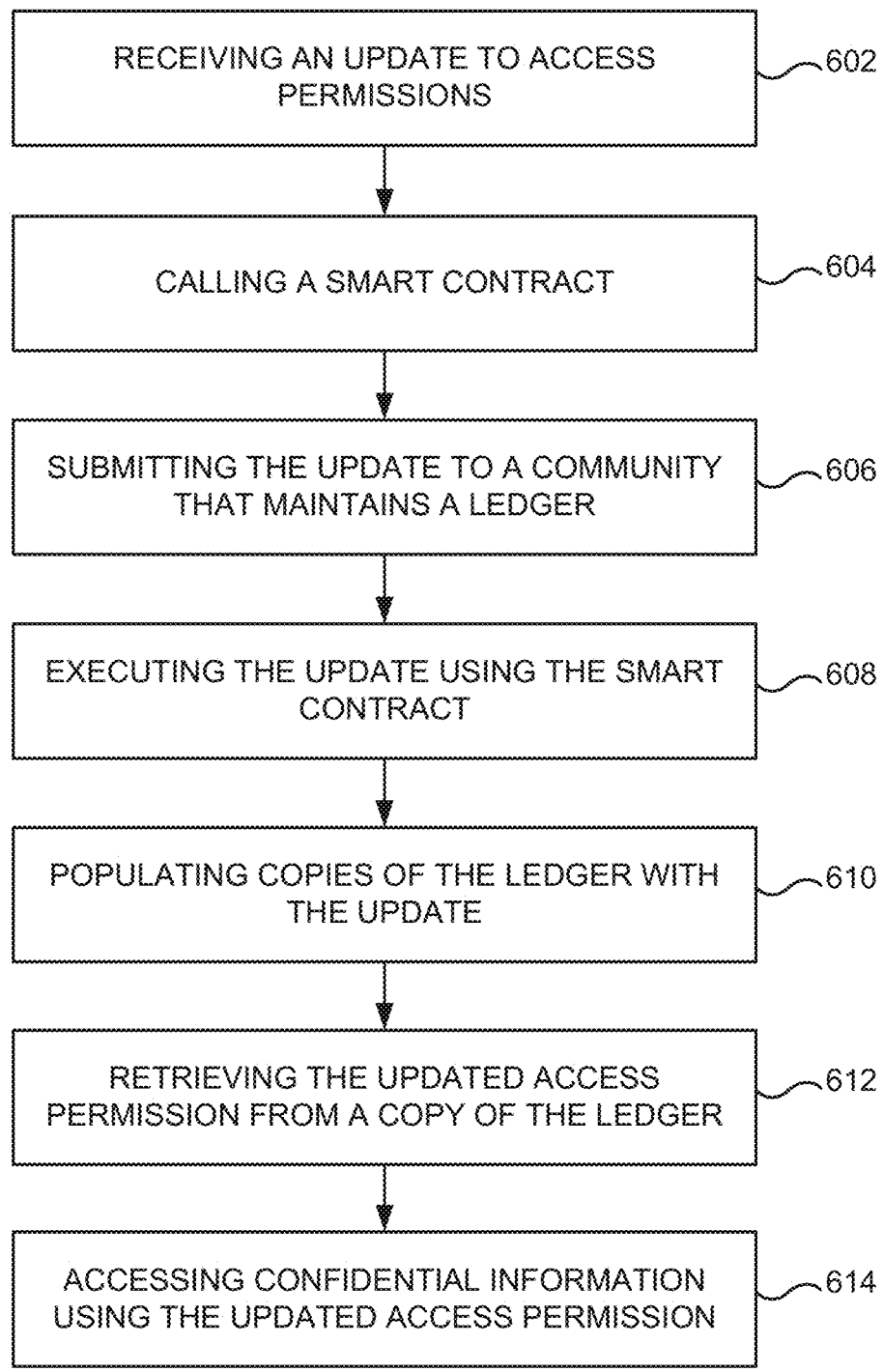
FIG. 6 illustrates securing access to confidential data using a blockchain ledger according to an example embodiment.

FIG. 6 illustrates an example functionality for securing access to confidential data using a blockchain ledger according to an example embodiment. In one embodiment, the functionality of FIG. 6 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 602, an update to access permissions from a first entity on behalf of a second entity can be received, wherein the update changes access permissions to a confidential data store. With reference to FIG. 1, a first identity of entity 102 (or partners 104 and/or 106) can request a change to access permissions for a second identity of entity 102. In some embodiments, the access permissions can secure confidential data stored at database 114. Database 114 can implement a security model that includes VPD and/or Oracle® security label protocols.

At 604, a smart contract can be called that validates the update. For example, a smart contract can be called that validates that the first identity has permission to update access permissions for the second identity. In an embodiment, such a validation can be performed using an identity management system (e.g., IDCS), and one or more software services for entity 102.

At 606, the update can be submitted to a plurality of members of a blockchain community. For example, the validated update can be proposed to members of the blockchain community (e.g., partners 104 and 106). At 608, upon consensus from a block chain community, the update to the access permissions for the second entity can be executed, wherein the update is appended to a blockchain ledger that stores access permissions for the blockchain community, the blockchain community comprising a plurality of different organizations that share access to the confidential data store.

At 610, distributed copies of the blockchain ledger can be populated with the update. For example, the new block can be appended to blockchain 108, and blockchain copies 110 and 112 can be populated with the new block.

At 612, the updated access permissions for the second identity can be retrieved from the blockchain. For example, a request to retrieve confidential data from database 114 can be received form the second identity. Database 114, in response to receiving the request, can retrieve the updated access permissions for the second identity from blockchain 108.

At 614, confidential information can be accessed by the second entity using the updated access permissions. In an embodiment, database 114 can return confidential information requested from database 114 that has security attributes that correspond to the retrieved access permissions for the second identity.

Embodiments manage access permissions for confidential information using a blockchain ledger. For example, some real-world circumstances call for multiple organizations to share access to confidential information. These circumstances can include the sharing of information identified as sensitive or confidential by a group or entity, such as a national government, in order to provide services to the group or entity, such as national security services. Other circumstances can similarly benefit from shared confidential information, such as joint ventures between organizations that rely on confidential or proprietary information, and the like.

In some embodiments, identities at each organization, such as individuals, can be granted access to various levels of the confidential information. For example, the confidential information can be stored in a database and keyed with varying security parameters (e.g., security classification level, title, project name, release, and the like). The access permissions for the identities of each organization can permit access to confidential information keyed with security parameters that correspond to the individual access permissions.

Embodiments secure access to the confidential information for these various identities across different organizations by managing access permissions and updates to access permissions using a blockchain ledger. For example, the different organizations that share access to the confidential information can represent members of a blockchain community. When an organization requests an updated to the access permissions for one of its identities, a sequence of actions can be triggered (e.g., a smart contract can be called) to execute the transaction. The change can be proposed to the blockchain community by the requesting organization/identity. Once the blockchain community reaches a consensus, the smart contract can execute the change. A transaction or block can be appended to the blockchain that reflects the change in access permissions for the identity.

Accordingly, the blockchain ledger can store up-to-date and transparent access permissions for identities of the community members (e.g., participating organizations). In some embodiments, when an identity requests access to the confidential information, the database can query the blockchain to retrieve the up-to-date access permissions for the requesting identity. These access permissions can then be used to retrieve corresponding confidential information from the database, thus ensuring that up-to-date and transparent access permissions are used to retrieve only the confidential information that the identity is permitted to access.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for securing access to confidential data using a blockchain ledger, the method comprising:
    receiving an update to access permissions from a first entity on behalf of a second entity, wherein at least a portion of data stored at a confidential data store is keyed with a hierarchical security parameter, the updated access permissions correspond to an update to the hierarchical security parameter, and the updated access permissions provide the second entity row level access to a secure relational data table stored at the confidential data store;
    calling a smart contract that validates the update; and
    upon consensus from a blockchain community, executing, using a processor, the update to the access permissions for the second entity, wherein the update is appended to a blockchain ledger that stores access permissions for the blockchain community, the blockchain community comprising a plurality of different organizations that share access to the confidential data store.

2. The method of claim 1, wherein the smart contract validates identities for the first entity and the second entity using an identity management system and validates that the identity of the first entity has permission to update security parameters for the identity of the second entity.

3. The method of claim 2, further comprising:
    receiving a request to access the confidential data store from the second identity;
    retrieving the updated access permissions for the second identity from the blockchain; and
    permitting, to the second identity, access to confidential information keyed with security parameters that correspond to the updated access permissions.

4. The method of claim 1, wherein the confidential data store comprises a virtual private database, and the access permissions correspond to security parameter for the virtual private database.

5. The method of claim 4, wherein the updated access permissions reflect a change in level for the hierarchical security parameter.

6. The method of claim 1, wherein the consensus is reached based on consensus actions from a threshold of the blockchain community, the consensus actions comprising electronic votes about the update to the access permissions, the electronic votes indicating whether the update to the access permissions should be executed.

7. The method of claim 1, wherein the blockchain ledger is used to verify access permissions for the first entity and the second entity.

8. The method of claim 7, wherein the blockchain ledger comprises an encrypted and immutable ledger of access permissions transactions for the blockchain community.

9. A non-transitory computer readable medium having instructions stored thereon that, when executed by a processor, cause the processor to secure access to confidential data, the securing comprising:
    receiving an update to access permissions from a first entity on behalf of a second entity, wherein at least a portion of data stored at a confidential data store is keyed with a hierarchical security parameter, the updated access permissions correspond to an update to the hierarchical security parameter, and the updated access permissions provide the second entity row level access to a secure relational data table stored at the confidential data store;
    calling a smart contract that validates the update; and
    upon consensus from a blockchain community, executing the update to the access permissions for the second entity, wherein the update is appended to a blockchain ledger that stores access permissions for the blockchain community, the blockchain community comprising a plurality of different organizations that share access to the confidential data store.

10. The non-transitory computer readable medium of claim 9, wherein the smart contract validates identities for the first entity and the second entity using an identity management system and validates that the identity of the first entity has permission to update security parameters for the identity of the second entity.

11. The non-transitory computer readable medium of claim 10, wherein the securing further comprises:
    receiving a request to access the confidential data store from the second identity;
    retrieving the updated access permissions for the second identity from the blockchain; and
    permitting, to the second identity, access to confidential information keyed with security parameters that correspond to the updated access permissions.

12. The non-transitory computer readable medium of claim 9, wherein the confidential data store comprises a virtual private database, and the access permissions correspond to security parameter for the virtual private database.

13. The non-transitory computer readable medium of claim 12, wherein the updated access permissions reflect a change in level for the hierarchical security parameter.

14. The non-transitory computer readable medium of claim 9, wherein the consensus is reached based on consensus actions from a threshold of the blockchain community, the consensus actions comprising electronic votes about the update to the access permissions, the electronic votes indicating whether the update to the access permissions should be executed.

15. The non-transitory computer readable medium of claim 9, wherein the blockchain ledger is used to verify access permissions for the first entity and the second entity.

16. The non-transitory computer readable medium of claim 15, wherein the blockchain ledger comprises an encrypted and immutable ledger of access permissions transactions for the blockchain community.

17. A system for securing access to confidential data using a blockchain ledger, the system comprising:
    a processor in communication with a storage device, wherein the processor is configured to execute instructions to:
    receive an update to access permissions from a first entity on behalf of a second entity, wherein at least a portion of data stored at a confidential data store is keyed with a hierarchical security parameter, the updated access permissions correspond to an update to the hierarchical security parameter, and the updated access permissions provide the second entity row level access to a secure relational data table stored at the confidential data store;

call a smart contract that validates the update; and upon consensus from a blockchain community, execute the update to the access permissions for the second entity, wherein the update is appended to a blockchain ledger that stores access permissions for the blockchain community, the blockchain community comprising a plurality of different organizations that share access to the confidential data store.

18. The system of claim 17, wherein the smart contract validates identities for the first entity and the second entity using an identity management system and validates that the identity of the first entity has permission to update security parameters for the identity of the second entity.

19. The system of claim 18, wherein the processor is further configured to execute instructions to:

receive a request to access the confidential data store from the second identity;

retrieve the updated access permissions for the second identity from the blockchain; and permit, to the second identity, access to confidential information keyed with security parameters that correspond to the updated access permissions.

20. The system of claim 18, wherein the blockchain ledger comprises an encrypted and immutable ledger of access permissions transactions for the blockchain community.

* * * * *